United States Patent
Li

[11] Patent Number: 6,131,425
[45] Date of Patent: Oct. 17, 2000

[54] AUTOMATIC SHIFT LEVER KNOB WITH AN IMBEDDED LOCK

[76] Inventor: Chi-Yuan Li, No. 740-7, Chung-Cheng Rd., Hsin-Chuang City, Taipei, Taiwan

[21] Appl. No.: 09/140,892

[22] Filed: Aug. 27, 1998

[51] Int. Cl.$^7$ .............................. B60R 25/06; F16H 57/00
[52] U.S. Cl. ................................................. 70/201; 70/247
[58] Field of Search .............................. 70/247, 201, 202, 70/192–197, 181–187

[56] References Cited

U.S. PATENT DOCUMENTS

| | | | |
|---|---|---|---|
| 4,747,278 | 5/1988 | Roncelli et al. | 70/201 |
| 5,289,735 | 3/1994 | Kato et al. | 70/247 |
| 5,329,792 | 7/1994 | Lee | 70/201 |
| 5,546,775 | 8/1996 | Lee | 70/201 |
| 5,596,894 | 1/1997 | Lee | 70/201 |
| 5,735,148 | 4/1998 | Hsiao | 70/201 |
| 5,765,413 | 6/1998 | Jung | 70/247 |
| 5,775,141 | 7/1998 | Li | 70/247 |
| 5,809,813 | 9/1998 | Wang | 70/247 |

FOREIGN PATENT DOCUMENTS 404283133  10/1992  Japan ........................................ 70/247

*Primary Examiner*—Darnell Boucher
*Attorney, Agent, or Firm*—Bacon & Thomas PLLC

[57] ABSTRACT

An automatic shift lever knob with an imbedded lock is disclosed. Wherein, a shifting axle-bore for insertion of a shift lever link is provided on the bottom of a casting of the shift lever knob. The top of the casting has on one side thereof a push button chamber for insertion of a push button to communicate with the axle-bore. The shift lever link is moved through pressing the push button. A lock seat extends outwardly from a lateral side of the casting and has a bore extending to communicate with the axle-bore or the push button chamber for insertion of the lock. The lock is provided for controlling motion of the push button or the shift lever link. And plastic is injection formed to envelop the casting and the lock to construct a completed shift lever knob. In this way, the lock is prevented from dismantling, and a function of theft proofing can be assured.

7 Claims, 15 Drawing Sheets

AUTOMATIC SHIFT LEVER KNOB WITH AN IMBEDDED LOCK

BACKGROUND OF THE INVENTION

1. Field of the Invention

The present invention is related to an automatic shift lever knob with an imbedded lock, and especially to an automatic shift lever knob pre-combined with a lock before being injection molded with and enveloped by plastic. By this, the lock and the casting of the knob can be combined as an integrate unit. And the locking member can be hidden therein. This can avoid dismantling of the lock. Thereby an effect of theft proofing can be attained.

2. Description of the Prior Art

Conventional theft-proof devices used presently are divided mainly into the electronic type and the mechanical type. In activating of an electronic type device, the storage batteries for it is always turned on, thereby consumption of electric energy is astonishingly large. It is often that the energy of the storage batteries for such a device is exhausted to induce the result of unable of activating a car. Hence the effect of theft proofing is doubtful.

Theft-proof devices for shift levers are provided mainly for the purpose of preventing thieves from moving the shift levers. In a conventional theft-proof device for fixing a shift lever, a base is required to weld to the body of a car for mounting a lock. Then a U shaped rod loops the shift lever is secured on the lock to lock the shift lever.

Such a theft-proof device for a shift lever is supposed to cooperate with a U shaped rod. The weight of the U shaped rod (shall be made of steel with high strength) and the lock head (being of the same material as that of the U shaped rod) is so large that a user will feel very heavy in operation.

In view of the above stated disadvantages, the theft-proof locks for cars used presently are all stressed on the interiors of the shift levers. And the principal thereof is that a lock is used to control the motion of a push button on a shift lever or a link on the shift lever. While a lock provided inside of the head of a shift lever in the markets is completed mostly by the way that the head of the shift lever is injection molded with plastic material and is enveloped by plastic, and then is assembled with the lock. In this way, no matter how fine the design of the structure for combining of the casting and the lock is, there still are defects in cooperation between them. And this can destroy esthetic appearance of the head of the shift lever.

Moreover, when the head of the shift lever is combined with the lock, the connection portions on the lock and the head of the shift lever are all exposed. The locking elements of the lock and the shift lever are uneasy to be hidden and are subjected to illegal breakage and the lock is subjected to dismantling. Therefore, effect of theft proofing is largely reduced.

Further, castings of the knobs of conventional shift levers are all integrally formed by injection molding. When in molding of the castings of the knobs of the shift levers, a casting of a knob of a shift lever of specified suitable length is molded according to the desired size for the shift lever mechanism on a car of a specified type. The defects thereof are concluded as follows:

1. There are extremely various types of cars in the markets. Although the shapes of the knobs on shift levers of the same brand can be unified, however, specified lengths of various knobs on various shift levers are different in pursuance of the types of the cars and for being coincident with the human body engineering for drivers. In a factory for manufacturing cars of the same brand, shift levers are injection molded with and enveloped by plastic after the castings of the knobs of the shift levers of different specified lengths are manufactured according to the sizes of various types of cars. By the fact that the shapes of the peripheries of push buttons are complicated, it will be an unnecessary waste in increasing the cost of manufacturing molds if the castings of the knobs of the shift levers of different specified lengths are manufactured in pursuance of various types of cars.

2. The lock manufacturers will design and make various shift-lever knobs in pursuance of the types of the cars. And specified castings of the shift-lever knobs shall be made before completion of the products of the shift-lever knobs. Although the specified shift-lever knobs are unified, the specified lengths thereof are different in pursuance of the types of the cars. Oppositely, the manufacturers shall make various specified castings of the shift-lever knobs. This makes the cost of the shift-lever knobs with locks very expensive under the situation that the cost of dies is unable to lower.

3. A lock manufacturer shall open a mould for the casting of a shift-lever knob for every type of car, if any lock of a type of car goes not so well as what expected, big loss will result on the manufacturer.

SUMMARY OF THE INVENTION

The present invention is directed to the mechanical type theft-proof devices. Wherein, locks are arranged to fit the appropriate structures of the knobs. The present invention is directed further to a design for the smaller theft-proof devices for automatic shift lever knobs to overcome the problem of heaviness as well as inconvenience of locking and unlocking of large theft-proof devices.

Therefore, the primary object of the present invention is to provide an automatic shift lever knob with an imbedded lock. Wherein, the casting of a shift lever knob is combined with the lock after it is completed, then plastic is injection formed on the head of the shift lever to envelop and make them a whole unit, the locking member and the connecting areas can be hidden therein. This can enhance the strength of combination between the lock and the head of the shift lever and can prevent the lock from being destroyed or dismantled. An also can enhance the theft-proof function of the lock. The structural characteristic of the present invention resides in a lock seat extending outwardly from the shift lever knob for insertion therein the lock. The lock seat is provided with a bore for such insertion, and after that, screws or pins can be used for fixing. The fixing screws are hidden to avoid dismantling of the lock, and the function of theft proofing can be assured.

Another object of present invention is to provide an automatic shift lever knob with an imbedded lock, wherein the lock seat can be separately manufactured in pursuance of the mode of production. Then it is assembled with the shift lever knob, and the assembly is injection formed as a whole.

Another object of present invention is to provide an automatic shift lever knob with an imbedded lock. In the present invention, the specifications of the castings of the shift lever knobs are unified. And various connector rods of specified lengths are also provided, they can be chosen with suitable lengths and are welded to the bottom of the shift lever knobs. So that the shift lever knobs can suit various specifications of shift lever mechanisms. This can save trouble as well as expenditure of mould opening for various shift-lever knobs, and thus is industrial valuable.

The present invention will be apparent in its objects and structure after reading the detailed description of the preferred embodiment thereof in reference to the accompanying drawings.

DETAILED DESCRIPTION OF THE PREFERRED EMBODIMENT

Figure 1:
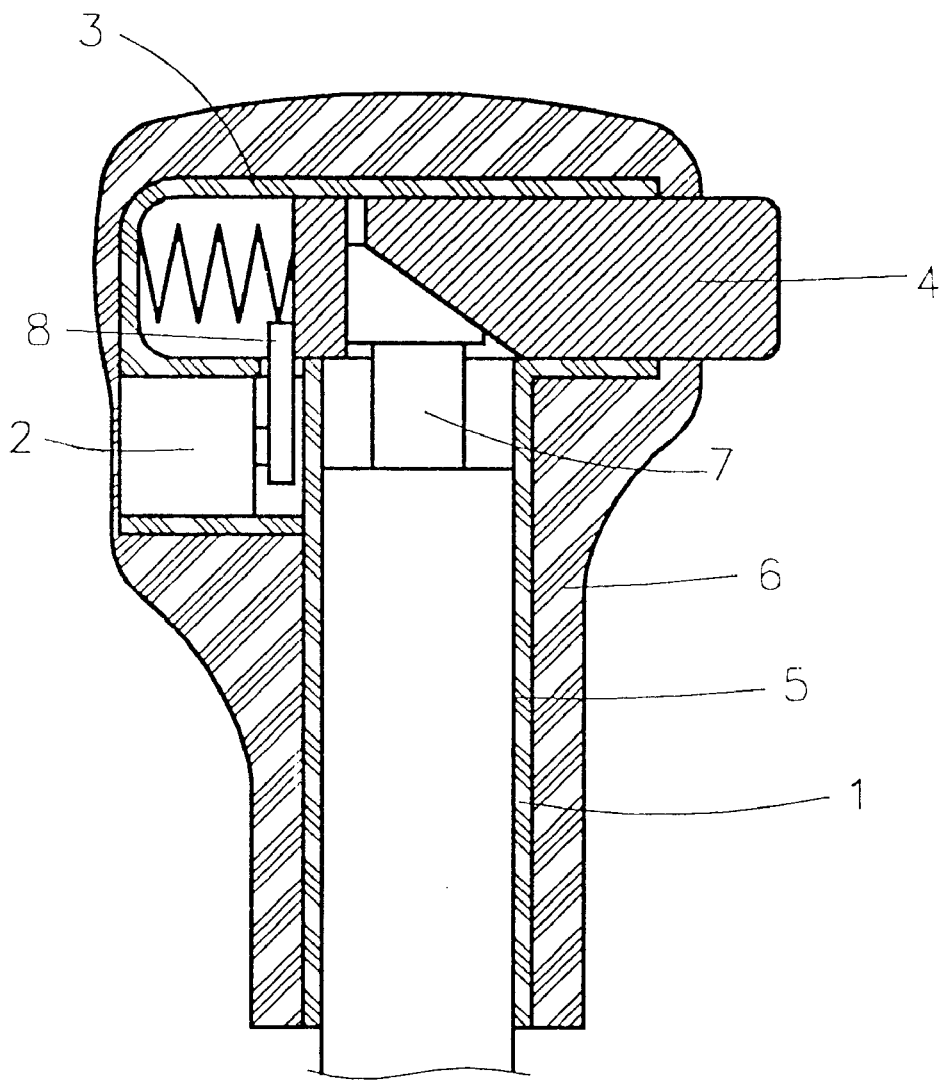
FIG. 1 is a sectional schematic view showing a conventional shift lever knob with a lock.

Referring to FIG. 1, a conventional automatic shift lever knob assembled with a lock is shown for comparison and is comprised of a casting 1 of the shift lever knob and a cover layer 6 covering the casting 1. In which, the casting 1 is provided on the bottom end thereof with a shifting axle-bore 5 for insertion of a shift lever link 7. The casting 1 is further provided on one side thereof with a push button chamber 3 for insertion of a push button 4 to communicate with the shifting axle-bore 5. The shift lever link 7 is exposed to the interior of the push button chamber 3 to cooperate with the push button 4. By cooperation of a bevel guiding-surface of the push button 4, when the latter is pressed, it drives the shift lever link 7 for moving of and shifting gear by the shift lever knob. The shift lever knob is provided on the other side of the casting 1 with a lock 2. An engaging piece 8 on the lock 2 is provided to impede motion of the push button 4 to obtain an effect of theft proofing. Such a shift lever knob with a lock 2 has a largest defect by the fact that, the lock 2 is assembled on the shift lever knob after the casting 1 is completely combined with the cover layer 6. Hence the connecting members (e.g., pins or screws) of the lock 2 and the shift lever knob are exposed, and are subjected to dismantling and theft, therefore, the function of them is not good.

Figure 2:
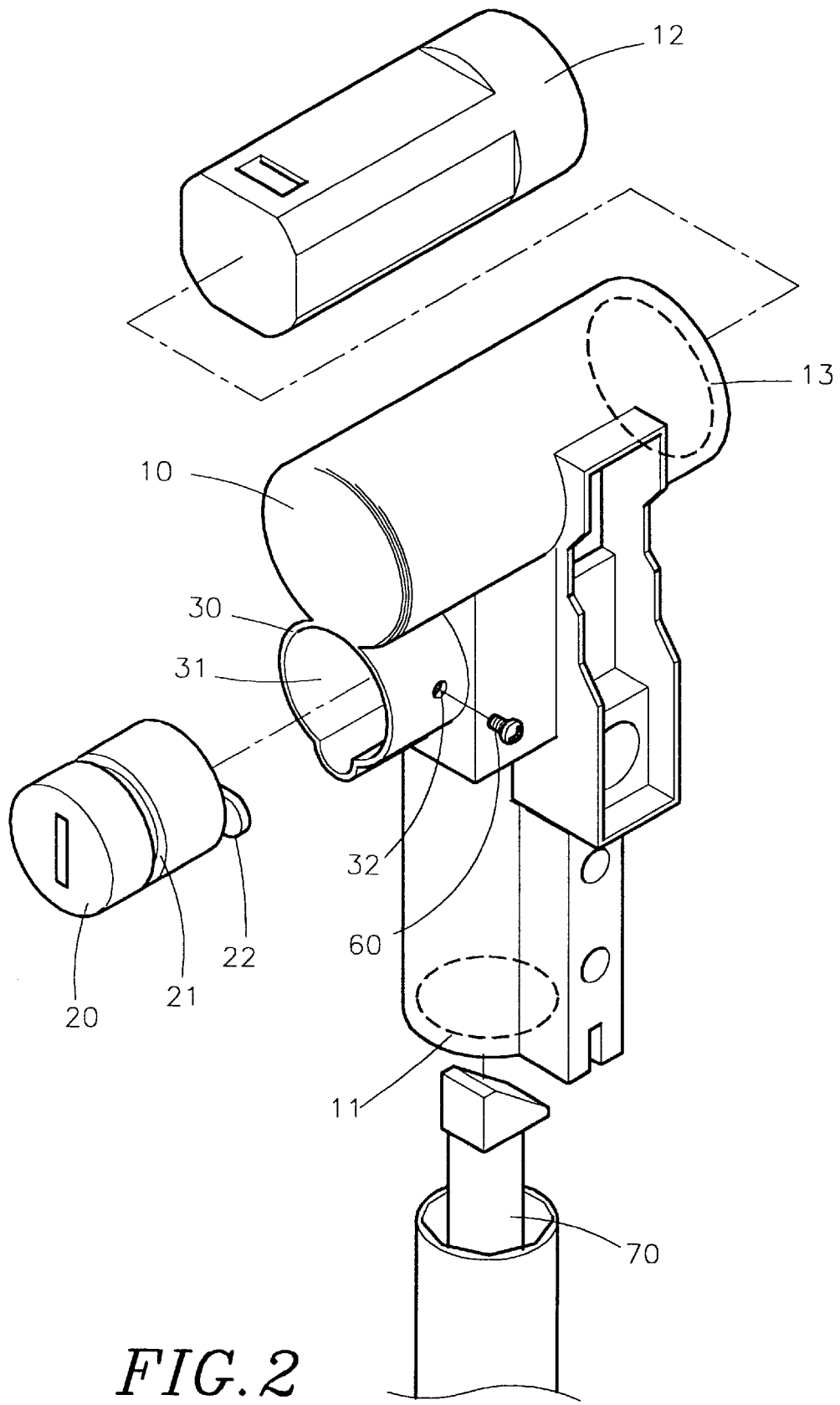
FIG. 2 is an analytic perspective view showing the first embodiment of the present invention.

FIG. 2 shows an automatic shift lever knob with an imbedded lock of the present invention, in which, a shifting axle-bore 11 for insertion of a shift lever link 70 is provided on the bottom of the casting 10. The top of the casting 10 is provided further on one side thereof with a push button chamber 13 for insertion of a push button 12 to communicate with the axle-bore 11. The shift lever link 70 is moved through pressing the push button 12. A lock seat 30 extends outwardly from a lateral side of the whole casting 10. The lock seat 30 is provided with a bore 31 which extends to communicate with the axle-bore 11 or the push button chamber 13 for insertion of the lock 20. The lock seat 30 is provided on the wall thereof with a screw hole 32 for insertion of a screw or pin 60 for connecting. The lock 20 is provided with a fixing groove 21 corresponding to the screw hole 32, and is provided on the end thereof with an engaging piece 22 for impeding motion of the push button 12 or the shift lever link 70.

Figure 3:
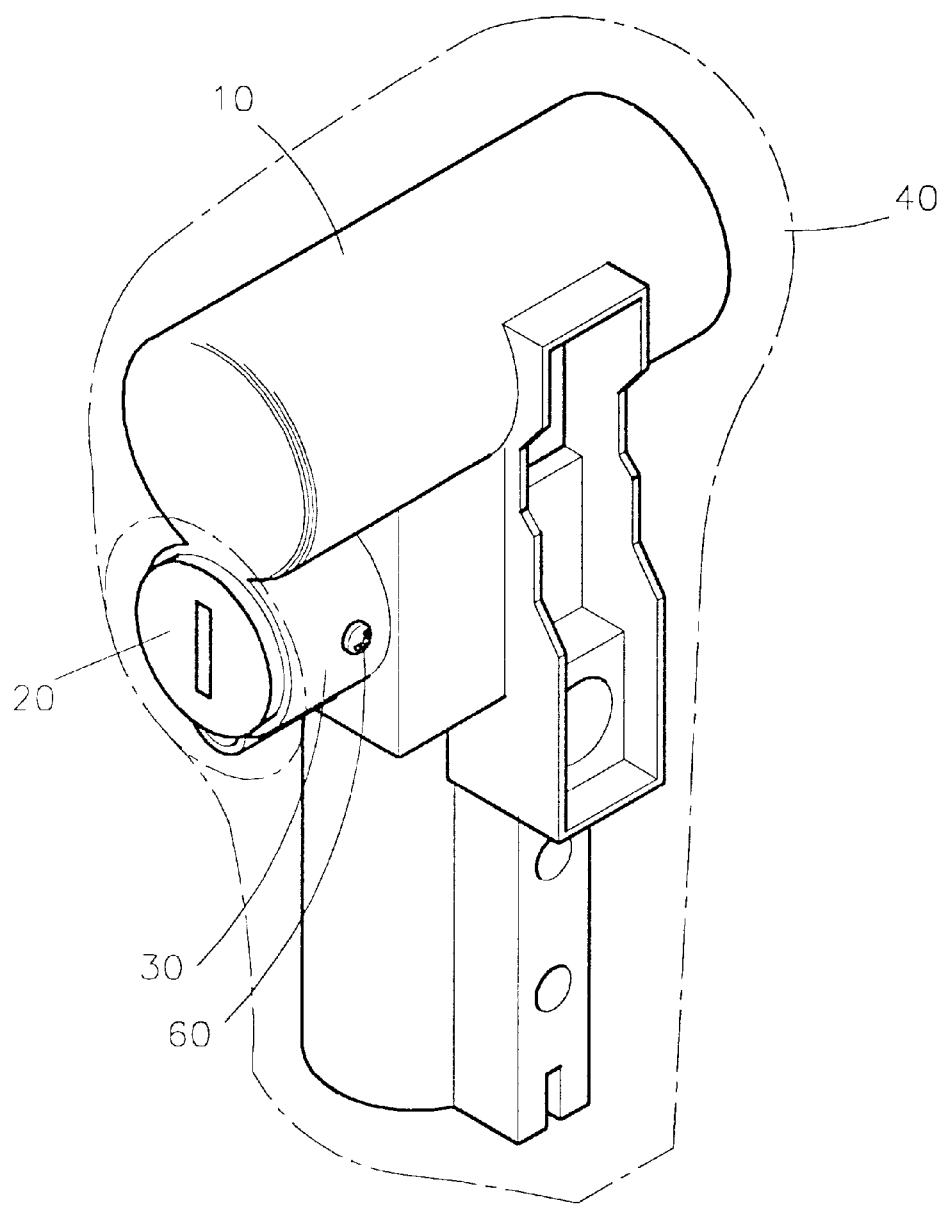
FIG. 3 is a schematic perspective view showing a shift lever knob of the first embodiment of a shift lever knob of the present invention after being injection formed with and enveloped by plastic.

When the lock 20 is placed in the bore 31 of the lock seat 30, it is secured with the screw or pin 60. Then plastic is injected thereon to form a cover layer 40 enveloping the casting 10 and the lock 20 (as shown in FIG. 3) to construct a completed shift lever knob 100 of which the locking members are all hidden. In this way, destroy or dismantling of the lock 20 can be prevented, and an effect of theft proofing can be assured.

Figure 4:
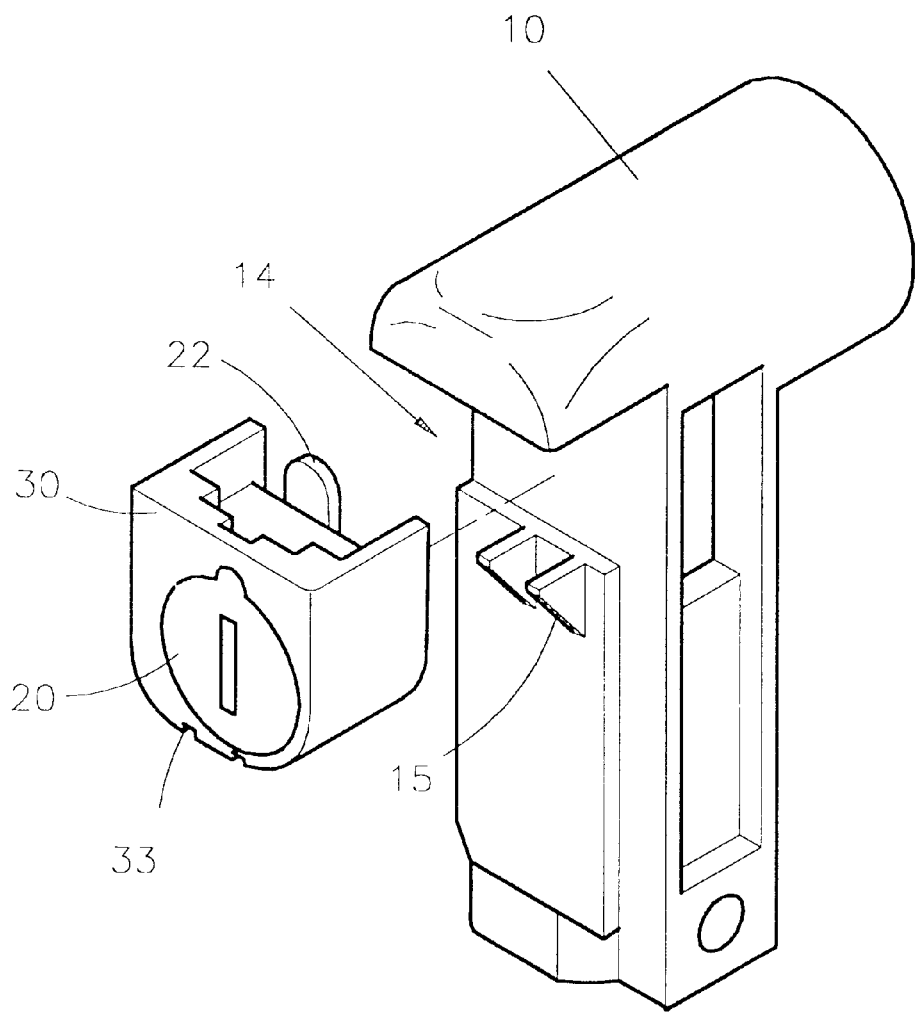
FIG. 4 is an analytic perspective view showing the second embodiment of the present invention.
Figure 5:
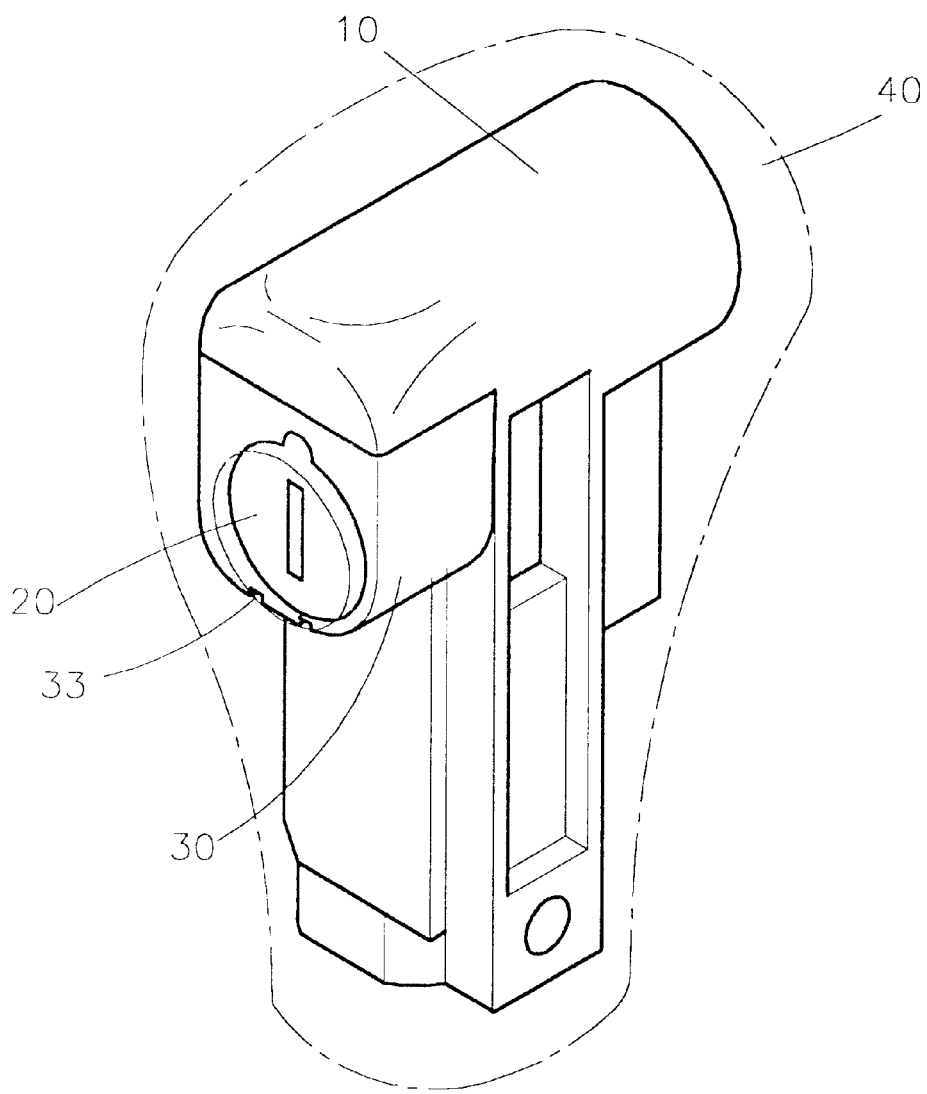
FIG. 5 is a schematic perspective view showing a shift lever knob of the second embodiment of a shift lever knob of the present invention after being injection formed with and enveloped by plastic.

As shown in FIG. 4, the casting 10 can suit a lot of lock seats 30 of different specifications separately manufactured in pursuance of various locks 20 of different specifications to be used. In this way, the casting 10 is not in necessity of opening different moulds for the various locks 20 of different specifications, hence cost of manufacturing can be reduced. Structurally, the casting 10 is provided with an open groove 14 for receiving a lock seat 30. The open groove 14 is provided at the bottom thereof with a pair of stop pieces 15. The lock seat 30 is provided on the bottom thereof with a pair of recesses 33 in matching with the stop pieces 15. The lock seat 30 containing a lock 20 is assembled on the casting 10 by connecting of the recesses 33 with the stop pieces 15, and then plastic is injected to envelop them as a whole (as shown in FIG. 5). In this way, the same object of preventing the lock 20 from destroying or dismantling can be attained.

Figure 6:
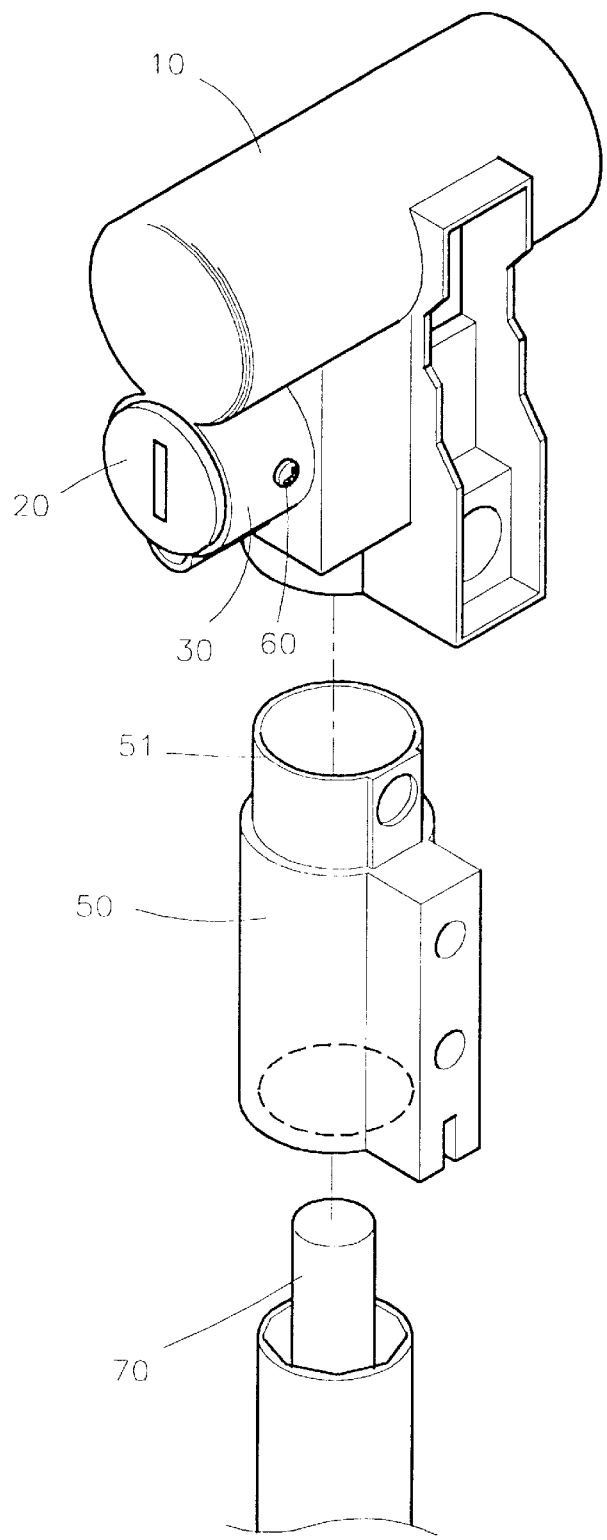
FIG. 6 is an analytic perspective view showing the third embodiment of the present invention.
Figure 7:
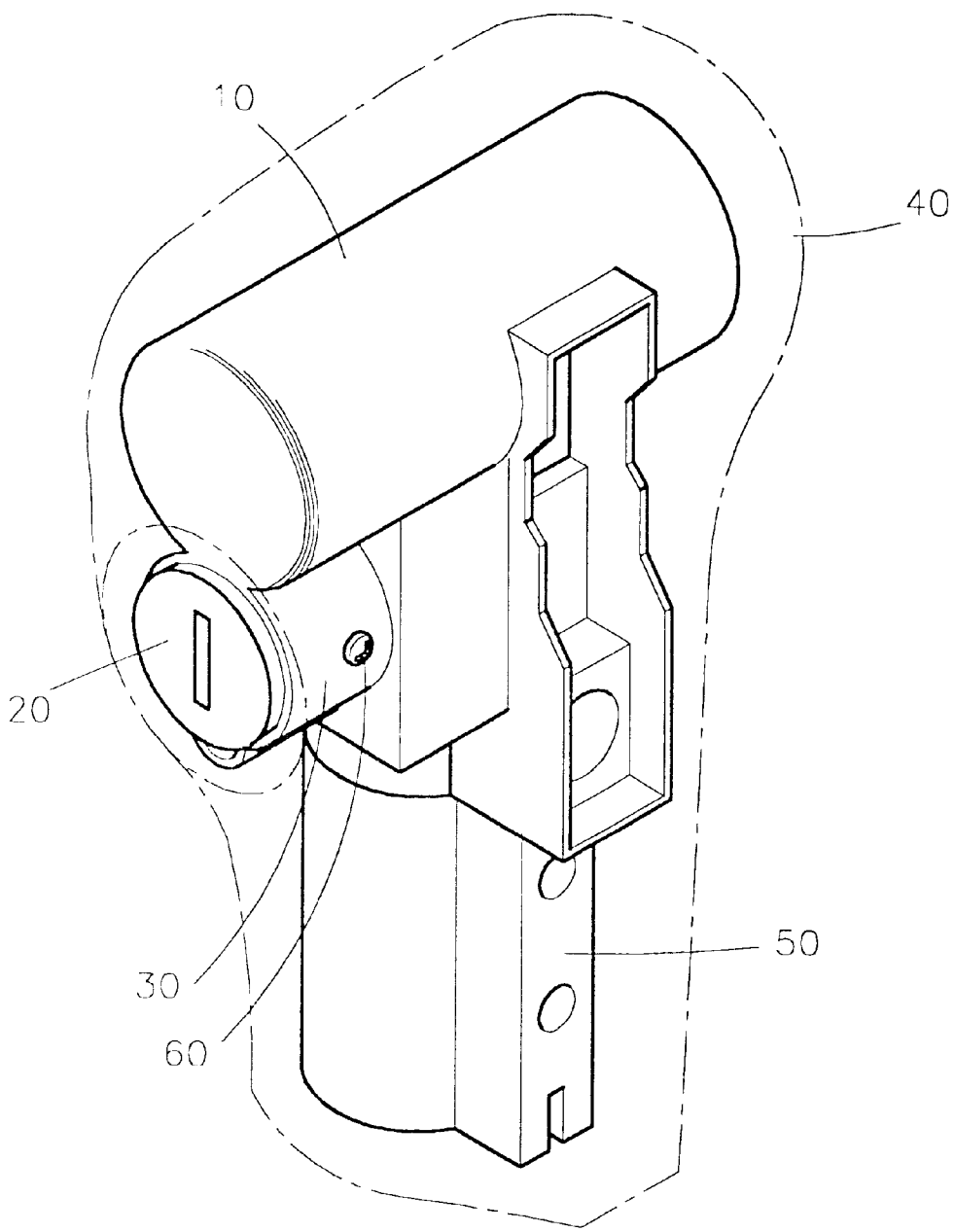
FIG. 7 is a schematic perspective view showing a shift lever knob of the third embodiment of a shift lever knob of the present invention after being injection formed with and enveloped by plastic.
Figure 8:
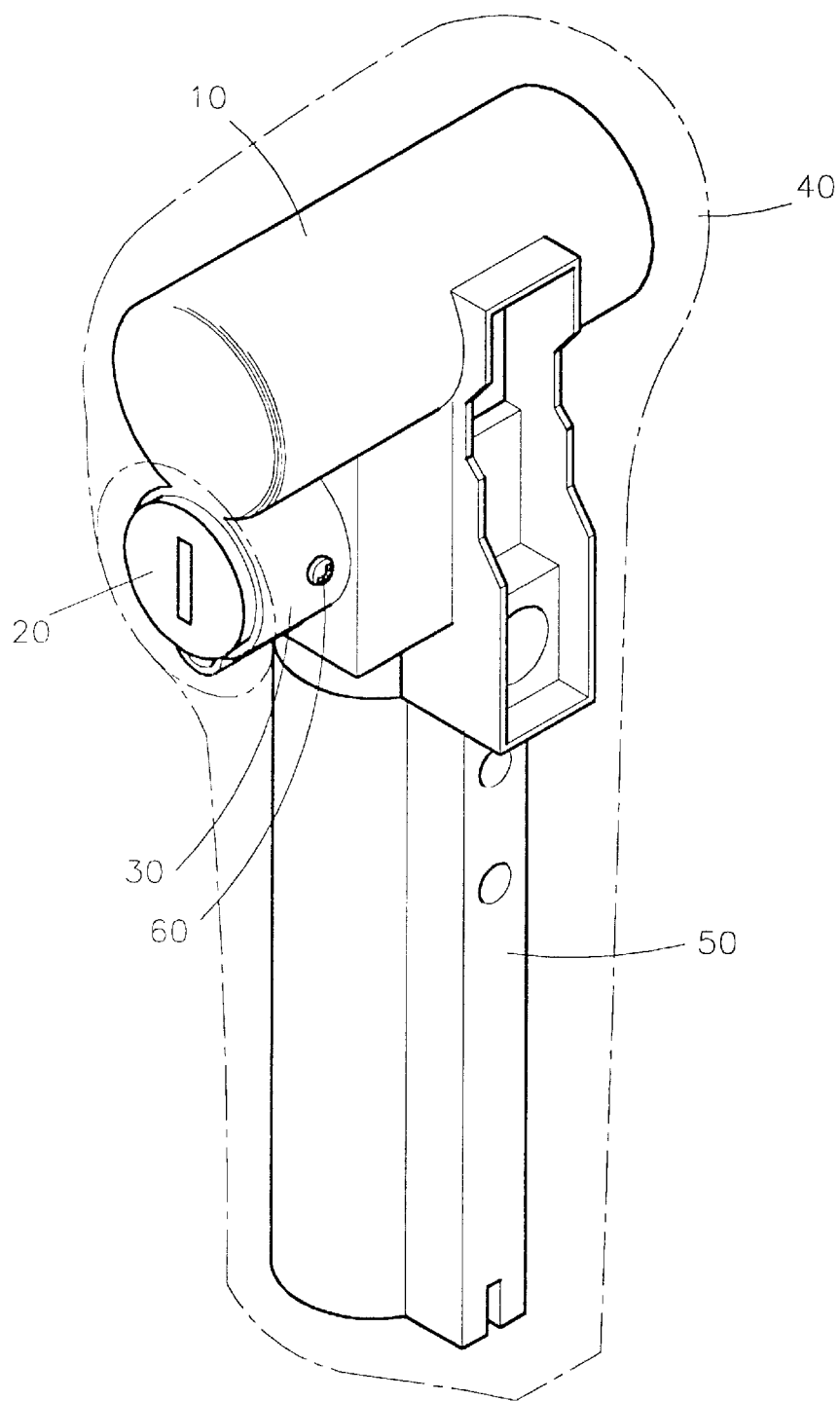
FIG. 8 is a schematic perspective view showing a shift lever knob of a variation of the third embodiment of a shift lever knob of the present invention after being injection formed with and enveloped by plastic.

And as shown in FIG. 6, 7 and 8, in the present invention, various connector rods 50 of different specifications are provided additionally. The top of each connector rod 50 is provided with an inserting end 51 for connecting to the bottom of a casting 10 to elongate the total length of the casting 10. By this means, the specification of the casting 10 can be unified. So that a suitable one of various connector rods 50 can be chosen for a specified type of car for assembling to get the desired total length of the casting 10. And castings 10 of the same specification can be used on shift lever mechanisms of various types. Moreover, the shapes of connector rods 50 are simpler, so that unnecessary expenditure for moulds can be saved.

Figure 9:
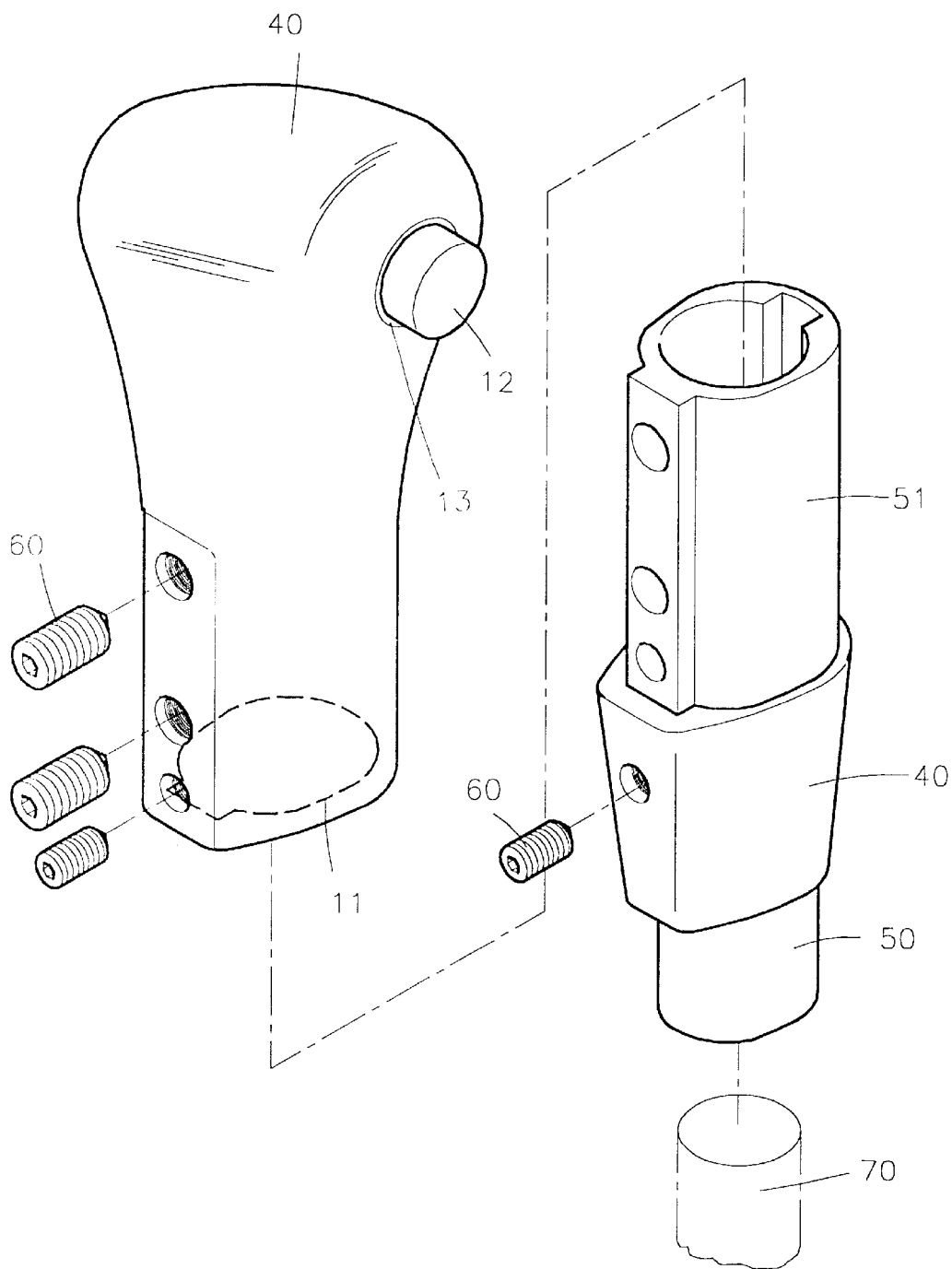
FIG. 9 is an analytic perspective view showing the fourth embodiment of the present invention.
Figure 10:
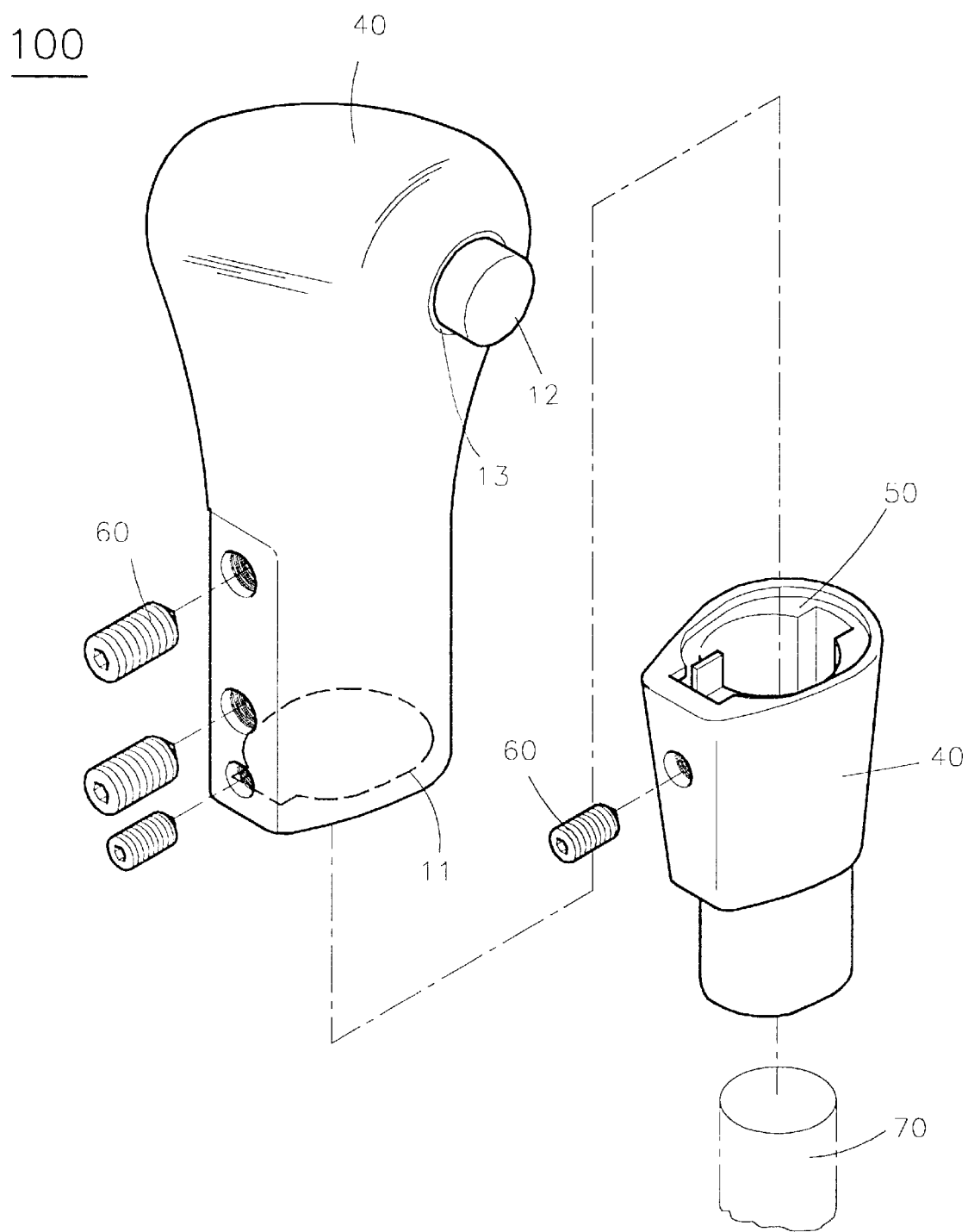
FIG. 10 is an analytic perspective view showing the fifth embodiment of the present invention.
Figure 11:
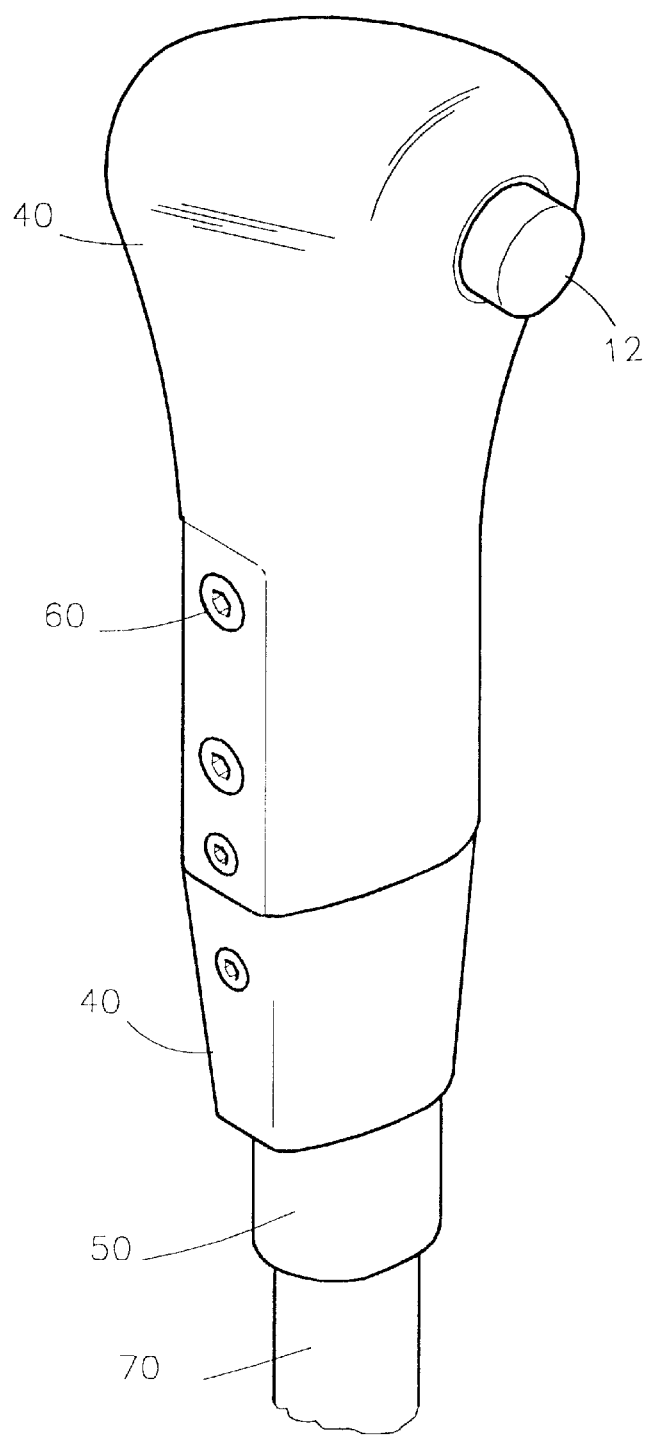
FIG. 11 is a perspective view showing an assembly combined from the fourth embodiment or the fifth embodiment of the present invention.

And as shown in FIG. 9 or 10, when in injection forming, the casting 10 and the connector rod 50 therein are separately manufactured, two cover layers 40 enveloping the casting 10 and the connector rod 50 shall be made in coincidence with the sizes of the latter. When the casting 10 and the connector rod 50 enveloped with the cover layers 40 are assembled with each other, a plurality of screws 60 are used to fixedly connect them together (as shown in FIG. 11).

Figure 12:
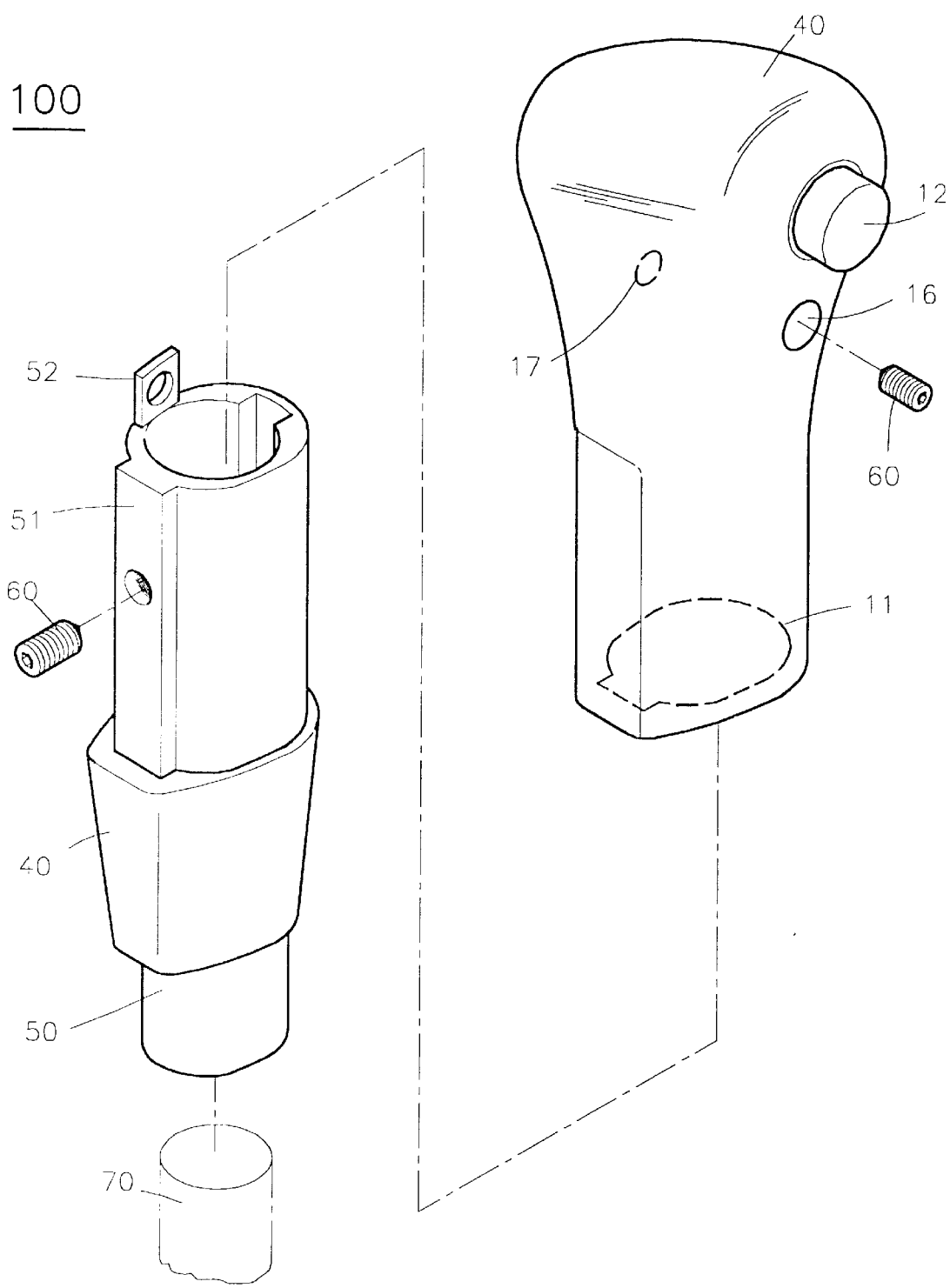
FIG. 12 is an analytic perspective view showing the sixth embodiment of the present invention.
Figure 13:
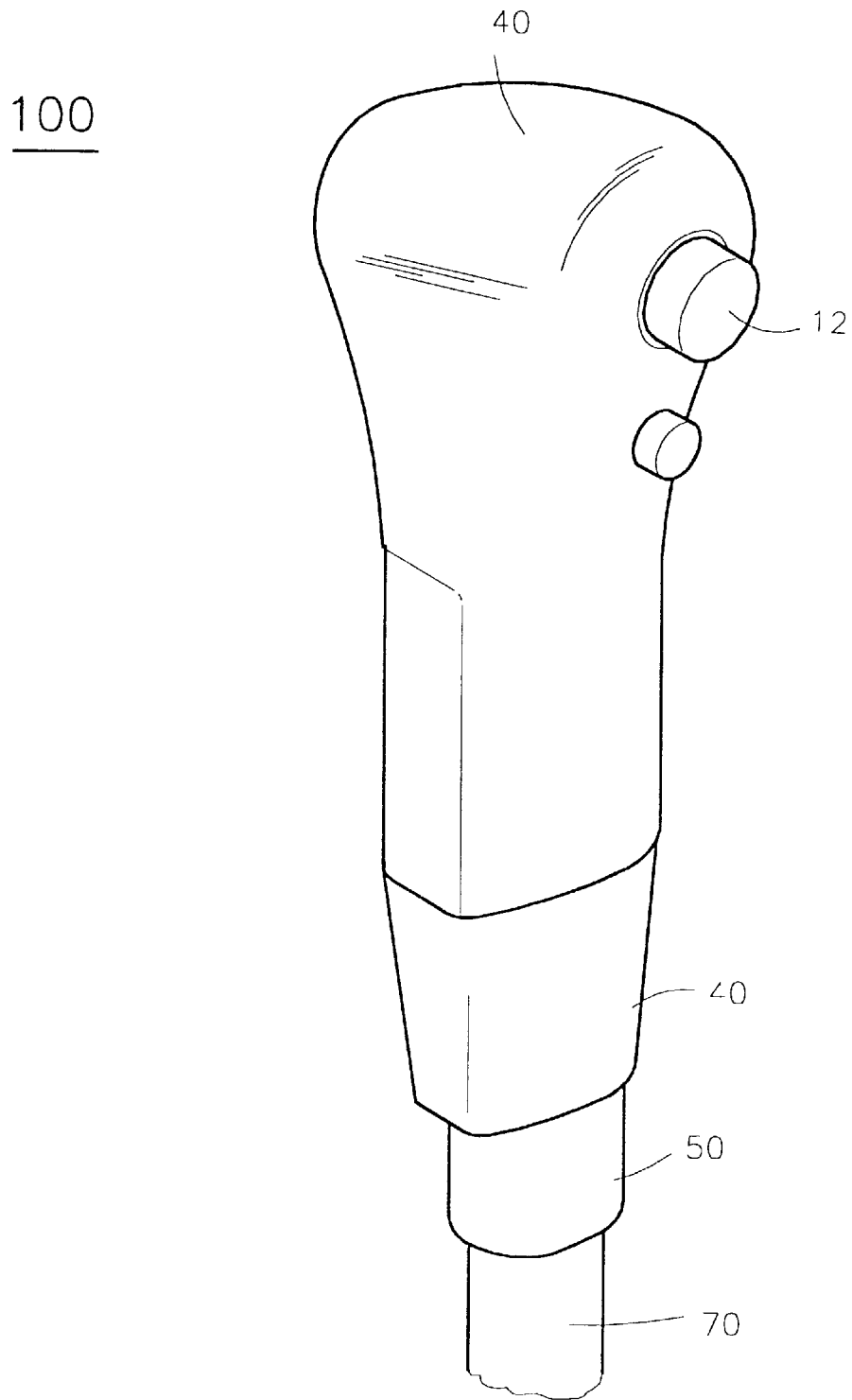
FIG. 13 is a perspective view showing the sixth embodiment of the present invention after assembling.

Referring to FIG. 12, the inserting end 51 of the connector rod 50 is provided with a fixing piece 52, and the casting 10 is provided interiorly with a connecting hole 17 opposite to the push button chamber 13 or a hole 16 for an OD push button. When the casting 10 and the connector rod 50 are assembled with each other, a screw 60 is used to connect the connector rod 50 to the connecting hole 17 through the connecting hole 17. Thus an automatic shift lever knob 100 as shown in FIG. 13 is formed, wherein, the screw 60 are hidden by the push button 12 or the OD push button, they can not be seen apparently of the automatic shift lever knob 100. Therefore, the casting 10 and the connector rod 50 are protected from being destroyed.

The structural features of the present invention reside in that, the present invention is combined with a lock before the casting 10 of the shift lever head is enveloped by plastic, while after being enveloped by the injected plastic, fixing of the lock and the shift lever head is completed. This is different from the mode of fixing of conventional locks and shift lever heads. Such improvement makes shift lever heads endued inherently with a locking function. The locks are firmly connected to the shift lever heads, and the connection areas of them can not be found. The locks 20 can be effectively prevented from dismantling, thus function of the locks can be improved. Moreover, by the design of separation of the members, one casting 10 can match various connector rods of different lengths, and thus suits various shift lever mechanisms. There is no more necessity to design and make specified castings for various shift lever mechanisms, this can not only lower cost of manufacturing, but also is industrial valuable.

Figure 14:
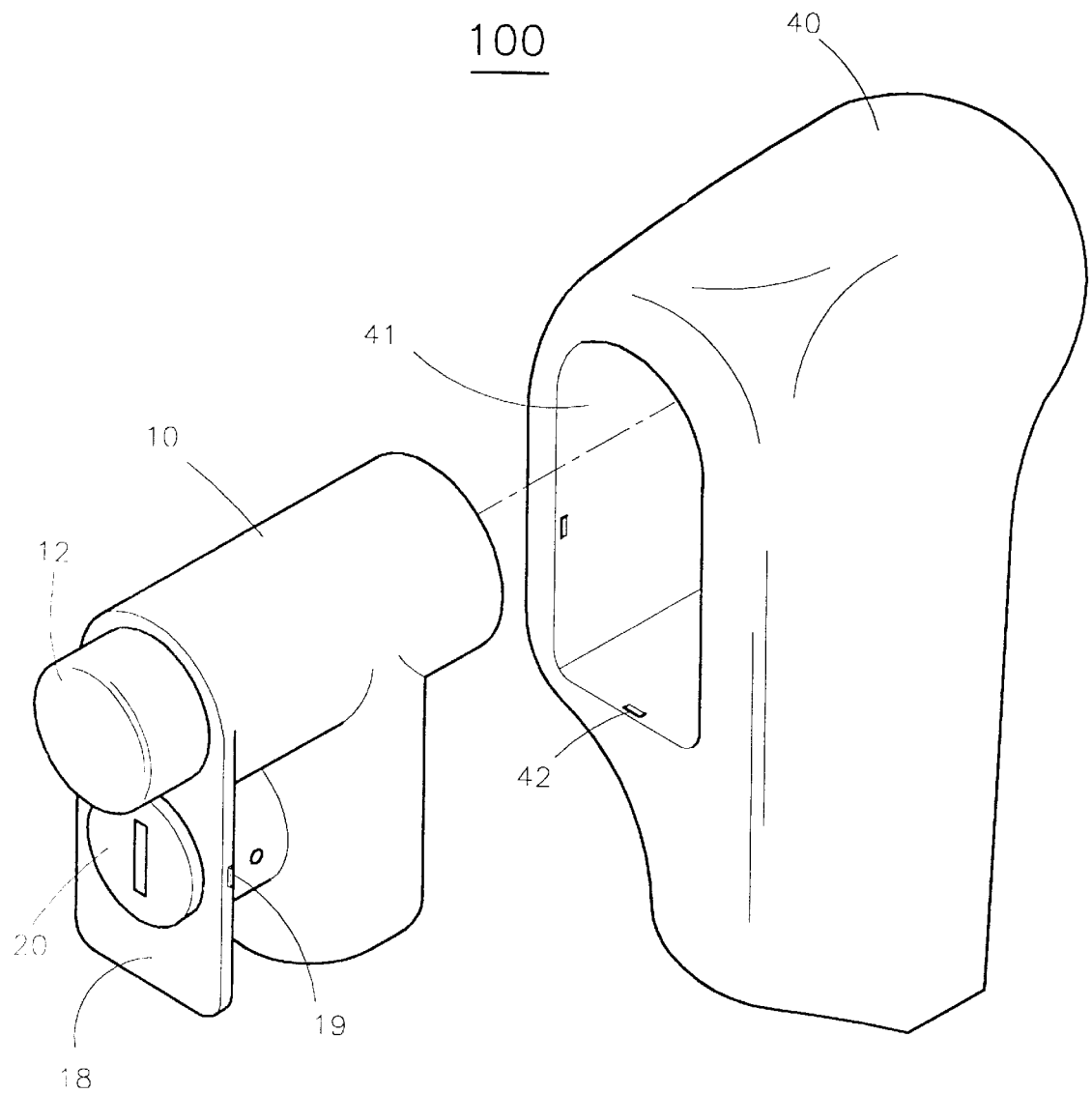
FIG. 14 is an analytic perspective view showing the seventh embodiment of the present invention.
Figure 15:
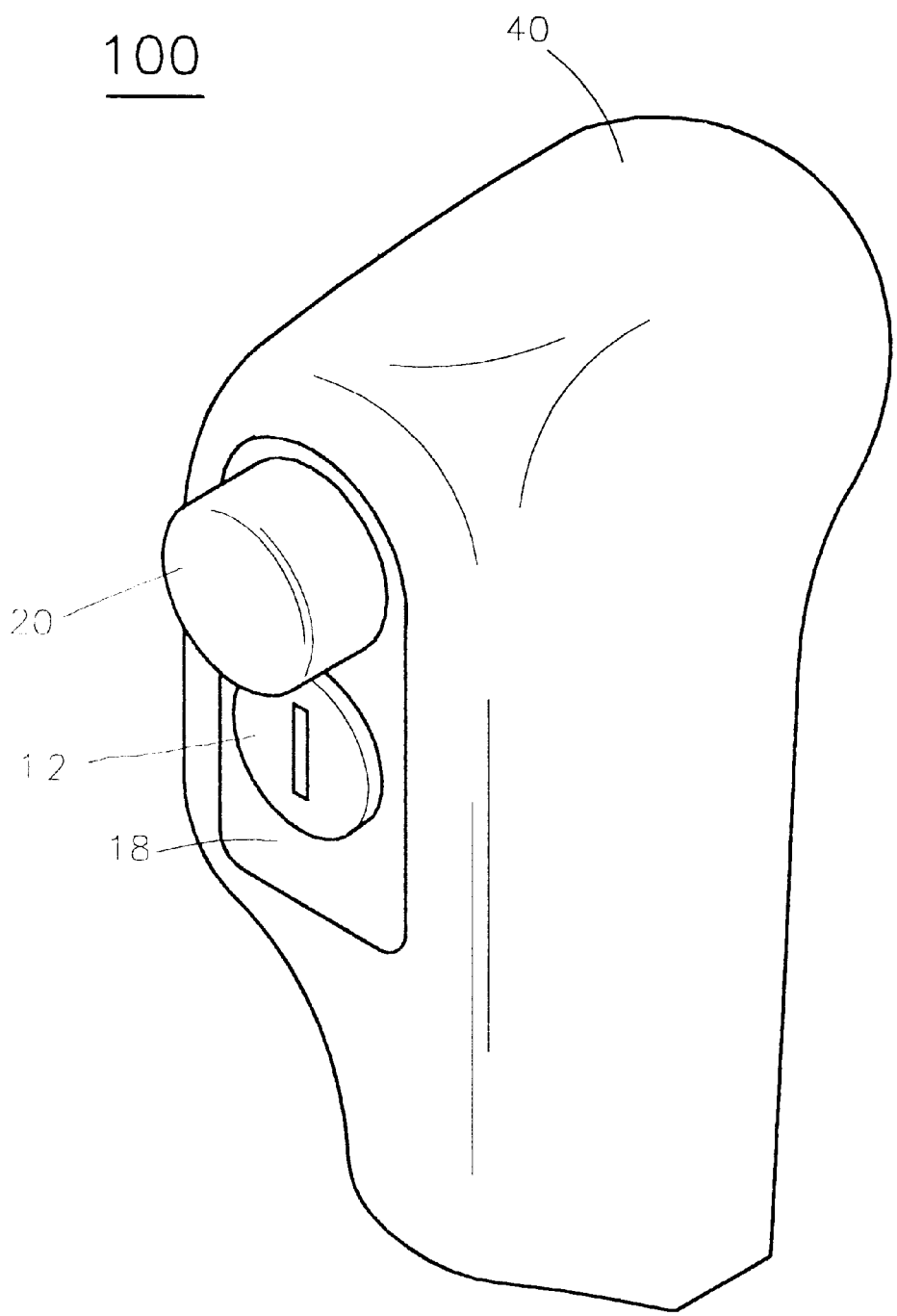
FIG. 15 is a perspective view showing the seventh embodiment of the present invention after assembling.

As shown in FIG. 14, for the sake of convenience in assembling in a processing line, the present invention can also has a cover layer 40 made in the first place, then a casting 10 is assembled with a lock 20. Structurally, the cover layer 40 is provided on one side thereof with a bore 41 exactly for insertion of the casting 10. The mouth of the bore 41 is provided with an engaging depression 42. And the casting 10 is provided on one end thereof with a lid 18 matchable with the bore 41. The lid 18 is provided peripherally with a tenon 19 corresponding to the engaging depression 42. When in assembling, after the casting 10 is assembled with the cover layer 40 in the bore 41, the lid 18 can cover the bore 41, and assembling of the casting 10 and the cover layer 40 can be completed (as shown in FIG. 15).

In conclusion, the automatic shift lever knob with an imbedded lock of the present invention can have the effect of preventing people from illegal dismantling the lock, it can also lower cost of manufacturing. Having thus described my invention, what I claim as new and desire to be secured by Letters Patent of the United States are:

What is claimed is:

1. An automatic shift lever knob with an imbedded lock, comprising:
    a shifting axle-bore for insertion of a shift lever link provided on the bottom of a casting, the top of said casting provided on one side thereof with a push button chamber for Insertion of a push button to communicate with said axle-bore, said shift lever link being moved by pressing said push button;
    a lock seat extending outwardly from a lateral side of said casting, said lock seat provided with a bore which extends to communicate with said axle-bore or said push button chamber for insertion of said lock, said lock provided on the end thereof with an engaging piece for impeding motion of said push button or said shift lever link;
    wherein said lock is secured in said bore of said lock seat with locking members which extend through a side wall of the lock seat, and plastic is injected thereon to form a cover layer enveloping said casting and said lock to construct a complete shift lever knob of which locking members on said lock and said lock seat are all hidden;
    wherein said lock seat is made separately and is assemblable with said casting; and
    wherein said casting is provided with an open groove for receiving said lock seat, said open groove is provided at the bottom thereof with a pair of stop pieces, said lock seat is provided on the bottom thereof with a pair of recesses for matching with said stop pieces, and said lock seat containing said lock is assembled on said casting by connecting of said recesses with said stop pieces.

2. An automatic shift lever knob with an imbedded lock as claimed in claim 1, wherein,
    said locking members for fixedly connecting said lock and said lock seat are screws or pins.

3. An automatic shift lever knob with an imbedded lock as claimed in claim 1, wherein,
    said casting suits any of various connector rods of different specification of length, the top of each of said connector rods is provided with an inserting end for connecting to the bottom of said casting of only one specification to elongate the total length of said casting, by this means, a suitable one of said various connector rods can be chosen for assembling to get the desired total length of said casting.

4. An automatic shift lever knob with an imbedded lock as claimed in claim 3, wherein,
    said casting and said one connector rod are separately manufactured by injection forming, two cover layers enveloping said casting and said connector rod shall be made in coincidence with the sizes of the latter, when said casting and said connector rod enveloped with said cover layers are assembled with each other.

5. An automatic shift lever knob with an imbedded lock as claimed in claim 3, wherein,
    said connector rod is provided with a fixing piece, and said casting is provided interiorly thereof with a connecting hole opposite to said push button chamber or a hole for an OD push button, when said casting and said connector rod are assembled with each other, a screw is used to connect them, wherein, said screws are hidden by said push button or said OD button.

6. An automatic shift lever knob with an imbedded lock comprising:
    a cover layer and a casting;
    a shifting axle-bore for insertion of a shift lever link in the bottom of the casting, said casting having a lid Portion with a first aperture for receiving a push button and a second aperture for accepting a lock;
    the top of said casting provided on one side thereof with a push button chamber aligned with said first aperture for insertion of a push button to communicate with said axle-bore, said shift lever link being moved by pressing said push button;
    wherein said cover layer is provided on one side thereof with a bore for insertion of said casting, the mouth of said bore is provided with an engaging depression and said lid portion being matchable with said bore, said lid portion being provided peripherally with a tenon corresponding to said engaging depression in order to snap-fit said casting with said cover layer.

7. An automatic shift lever knob with an imbedded lock as claimed in claim 1, wherein said lock is provided with a fixing groove for receiving ends of the locking members.

* * * * *